US010805350B2

(12) United States Patent
Koul et al.

(10) Patent No.: US 10,805,350 B2
(45) Date of Patent: Oct. 13, 2020

(54) SYSTEM AND METHOD FOR PROVIDING SECURITY SERVICES USING A CONFIGURATION TEMPLATE IN A MULTI-TENANT ENVIRONMENT

(71) Applicant: Oracle International Corporation, Redwood Shores, CA (US)

(72) Inventors: Rohit Koul, Sunnyvale, CA (US); Vineet Garg, Foster City, CA (US); Dongguang Zhou, Sunnyvale, CA (US); Amit Agarwal, Milpitas, CA (US); Yu Long Cao, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 166 days.

(21) Appl. No.: 15/897,651

(22) Filed: Feb. 15, 2018

(65) Prior Publication Data

US 2019/0253457 A1 Aug. 15, 2019

(51) Int. Cl.

| | |
|---|---|
| ***G06F 21/00*** | (2013.01) |
| ***H04L 29/06*** | (2006.01) |
| *H04L 29/08* | (2006.01) |

(52) U.S. Cl.

CPC .............. *H04L 63/20* (2013.01); *H04L 63/10* (2013.01); *H04L 63/06* (2013.01); *H04L 67/10* (2013.01)

(58) Field of Classification Search

CPC ..... H04L 67/10; H04L 67/02; H04L 41/5096; H04L 63/08; H04L 63/105; H04L 67/34; H04L 41/22

See application file for complete search history.

(56) References Cited

U.S. PATENT DOCUMENTS

2009/0282045 A1* 11/2009 Hsieh .................. G06F 21/6218
2014/0331337 A1* 11/2014 Factor ..................... G06F 21/62 726/30

* cited by examiner

*Primary Examiner* — Ghazal B Shehni
(74) *Attorney, Agent, or Firm* — Tucker Ellis LLP

(57) ABSTRACT

In accordance with an embodiment, described herein is a system and method for providing security services using a security configuration template in a multi-tenant environment. The system can load a security configuration template in memory when the multi-tenant environment starts, and can use the security configuration template to create a multi-headed tree to represent tenant-specific security configurations. Each head of the multi-headed tree can represent a root node of either the security configuration template or a tenant-specific security configuration. Each tenant-specific security configuration can reuse one or more nodes in the security configuration template by referencing those nodes, and can include one or more new nodes created from the security configuration template by replacing each placeholder therein with tenant-specific values. By creating tenant-specific security configurations on the fly in memory, the system can simplify the tenant onboarding process and save precious computing and storage resources, e.g., in a cloud environment.

16 Claims, 12 Drawing Sheets

SYSTEM AND METHOD FOR PROVIDING SECURITY SERVICES USING A CONFIGURATION TEMPLATE IN A MULTI-TENANT ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for providing security services using a security configuration template in a multi-tenant environment.

BACKGROUND

A multi-tenant environment, e.g., a Platform as a Service (PaaS) or a Software as a Service (SaaS), needs to maintain isolation of configurations, data, and runtimes for various tenants, so that requests from the tenants can be handled concurrently, without one tenant's operations affecting those of another tenant. The isolation of configurations, data, and runtimes can be provided by tenant-specific security services (e.g., credential services and authorization services), which are configured using tenant-specific security configurations and security artifacts (e.g., policies) stored in separate tenant-specific partitions/data stores.

As such, a multi-tenant environment needs to manage multiple copies of security configuration files and security artifacts, which can slow down the process of tenant onboarding, and use up precious computing and storage resources, particularly when the multi-tenant environment is cloud-based.

SUMMARY

In accordance with an embodiment, described herein is a system and method for providing security services using a security configuration template in a multi-tenant environment. The system can load a security configuration template in memory when the multi-tenant environment starts, and can use the security configuration template to create a multi-headed tree to represent tenant-specific security configurations. Each head of the multi-headed tree can represent a root node of either the security configuration template or a tenant-specific security configuration. Each tenant-specific security configuration can reuse one or more nodes in the security configuration template by referencing those nodes, and can include one or more new nodes created from the security configuration template by replacing each placeholder therein with tenant-specific values. By creating tenant-specific security configurations on the fly in memory, the system can simplify the tenant onboarding process and save precious computing and storage resources, e.g., in a cloud environment.

DETAILED DESCRIPTION

Figure 1:
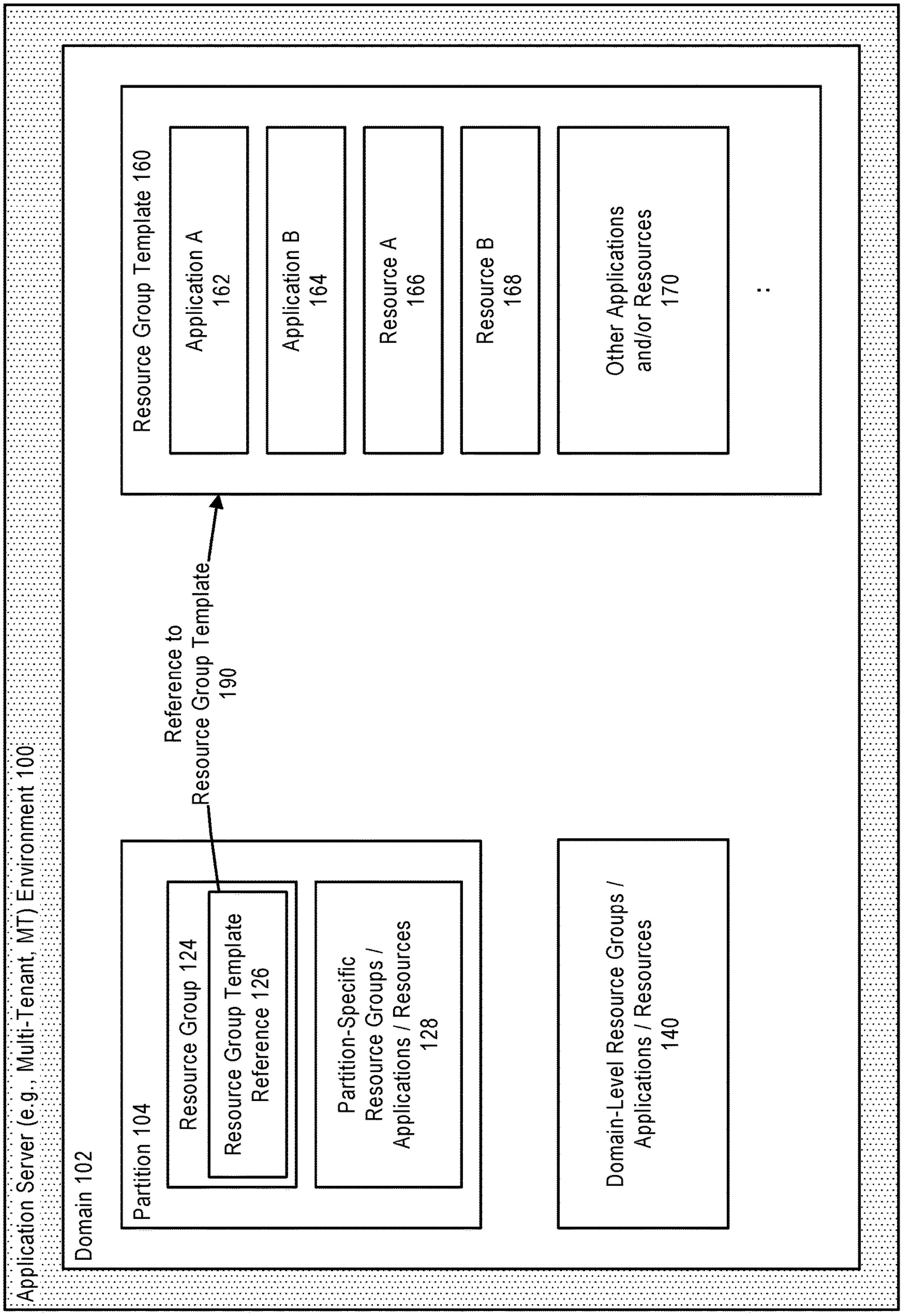
FIG. 1 illustrates a system for supporting multi-tenancy in an application server, cloud, or other environment, in accordance with an embodiment.

The following detailed description of example implementations refers to the accompanying figures. The same reference numbers in difference drawings may identify the same or similar elements.

In a multi-tenant environment, e.g., a Platform as a Service (PaaS), tenants generally share infrastructures, applications or databases in order to gain price and performance advantages. Security services can provide runtime isolations for various tenants of a multi-tenant environment. The security services can start life as single tenant services, with some default configuration and data. As more tenants are onboarded, a repetitive process can be used to make the security services multi-tenant aware by referring to multiple configurations and each tenant's data (security artifacts). Alternatively, a different set of security services can be started for each tenant using security configurations and security artifacts for the tenant.

As described above, maintaining multiple security configurations and security artifacts in a multi-tenant environment can slow down the process of tenant on-boarding, and use up precious computing and storage resources.

To address this, in accordance with an embodiment, described herein is a system and method for configuring security services using a security configuration template in a multi-tenant environment. The security configuration template can model a security configuration of a single tenant environment, and can be loaded in memory when the multi-tenant environment starts. When tenants are onboarded to the multi-tenant environment, a configuration management service can create a multi-headed tree in the memory to represent tenant-specific security configurations.

In accordance with an embodiment, each head of the multi-headed tree can represent a root node of the security configuration template, or a root node of a tenant-specific security configuration. Each tenant-specific security configuration can reuse one or more nodes in the security configuration template by referencing those nodes, and can include one or more new nodes that are created from the security configuration template by replacing each placeholder in the security configuration template with tenant-specific values.

In accordance with an embodiment, an application or service (e.g., a PaaS or an SaaS) can be started as a single tenant system using the security configuration template, which can include placeholders for tenant specific attributes (e.g., tenant encryption key, tenant data store details, tenant configuration location, etc.), and a default value can be provided for each placeholder.

In accordance with an embodiment, when a request specific to a tenant is received during the on-boarding process of the tenant, the configuration management service can create a new security configuration based on the security configuration template by substituting the tenant specific values for the place holders. One or more tenant-specific security services can be started based on this in-memory representation. At runtime, when additional requests come in for the tenant, a runtime tenant context can be created based on the template-driven security configuration, for use in handling the additional requests.

In accordance with an embodiment, tenant-specific security configurations are maintained in memory, and do not need to be persisted on disk or to a data store. When virtual machines (VMs) hosting the security services restarted, each security configuration specific to a tenant can be recreated and wired on a first request from the tenant.

In accordance with an embodiment, under the template-based approach to creating security configurations, the system can store a security configuration file (e.g., the security configuration template), and can create tenant-specific security configurations in memory on the fly when those tenants are onboarded.

As such, the template-based approach enables a multi-tenant environment to handle tenant requests and management operations through a single security configuration template, and therefore can save precious storage and computing resources, and reduce overhead required to provision and onboard new tenants.

In a multi-tenant environment, the template-based approach can also negate the need to store and manage multiple security configurations in a configuration store, and facilitate the setup and management of the security configurations and security artifacts, thereby simplifying the tenant onboarding process.

Multi-Tenant Environment

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
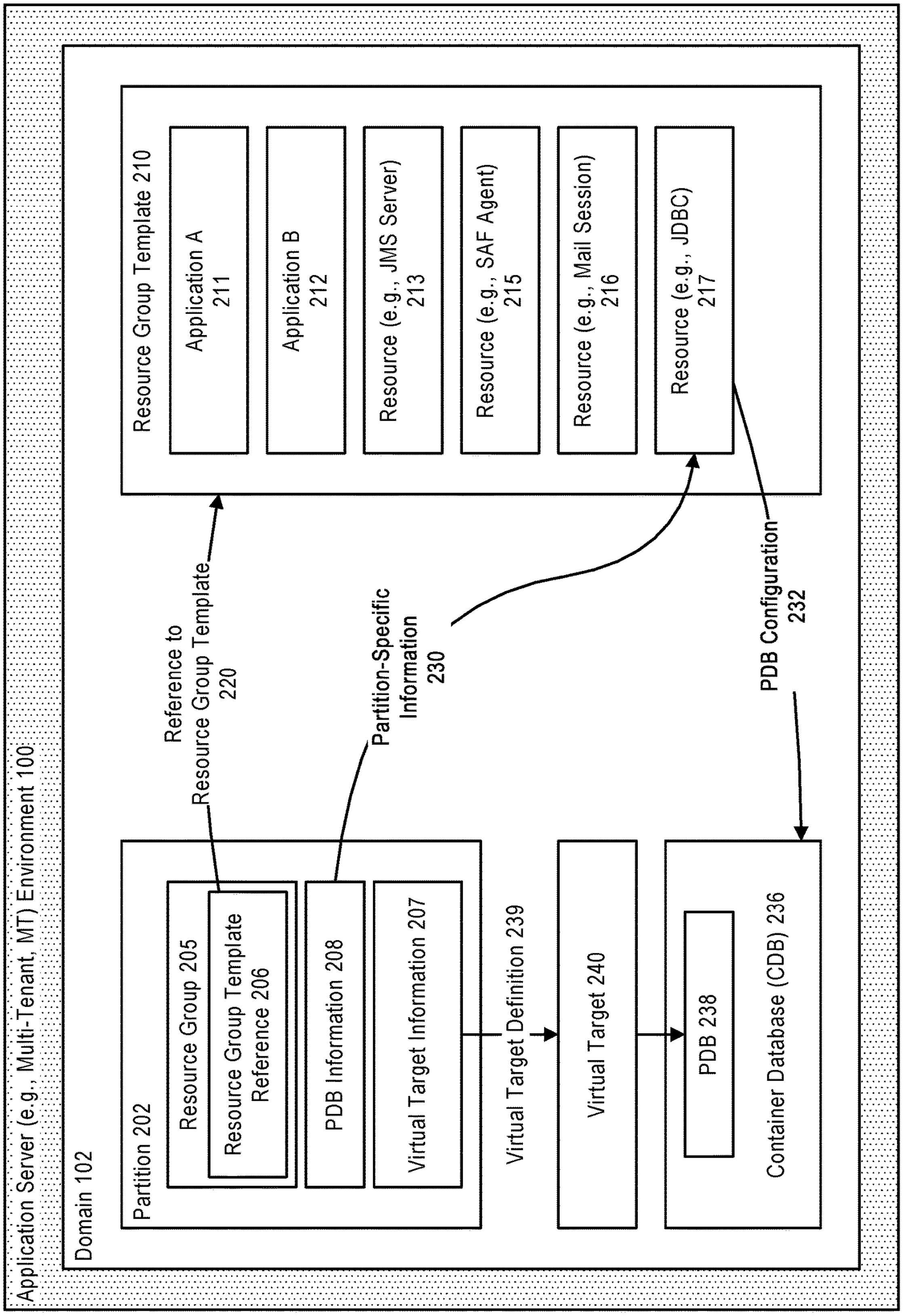
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
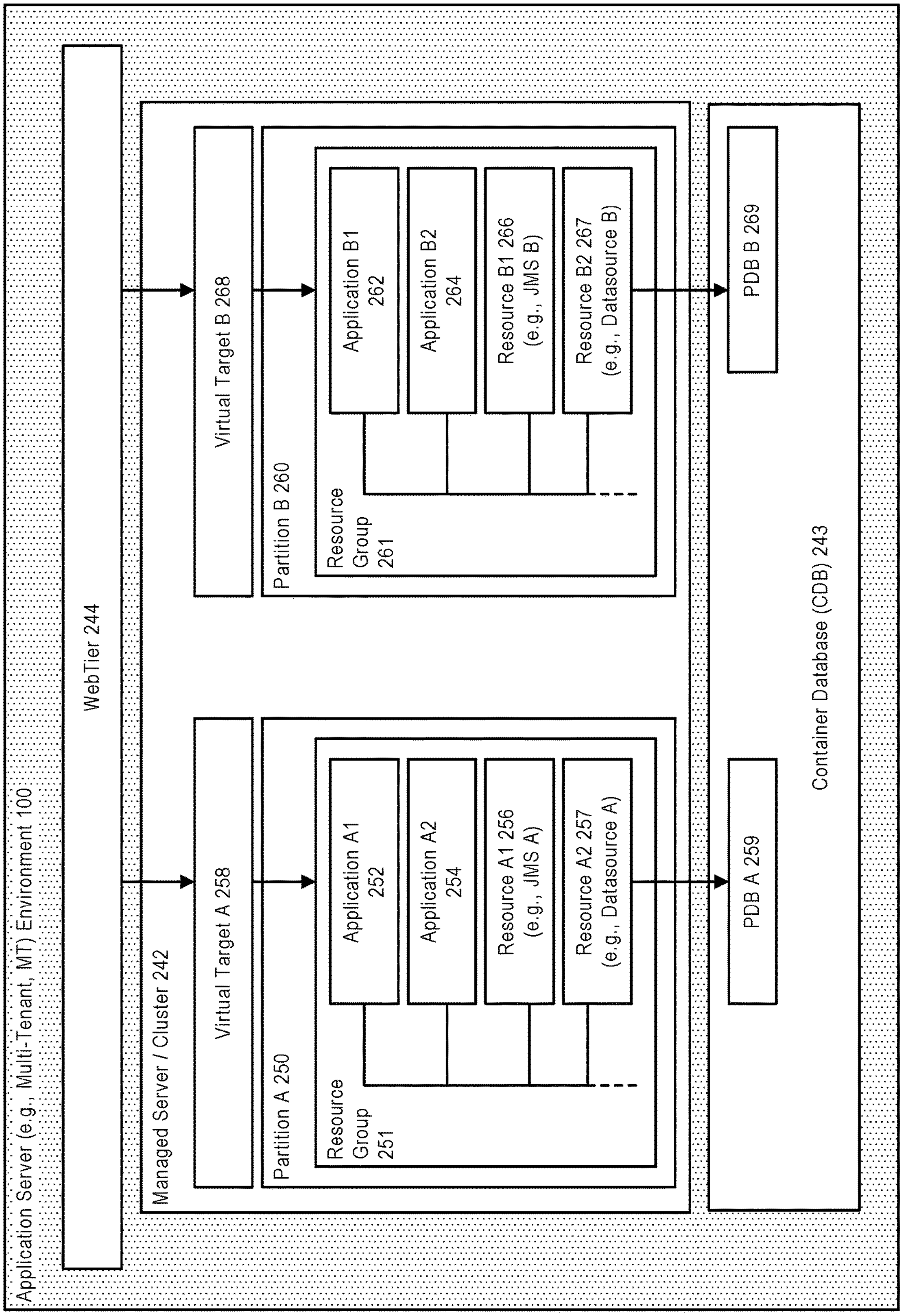
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Tenant Onboarding

In a multi-tenant environment as described above, identities, policies, credentials, keys, and audit are fundamental to securing applications and provide runtime isolations for various tenants. Each of the above functionalities can be provided by a security using associated security artifacts/data stored in a corresponding data store.

For example, Oracle Platform Security Services (OPSS) provides a standards-based security framework used to validate users based on a user name/password combination or a certificate. Security data such as users and groups can be stored in the WebLogic Server Default Authenticator. The OPSS authorization service provides a central repository of system and application policies and roles. Application roles can include enterprise users and groups specific to the application (such as administrative roles). A policy specifies the permissions granted to code loaded from a given location, and can use any of these groups or users as principals.

As another example, the OPSS credential service provides a central repository of artifacts that certify the authority of users, Java components, and system components. A credential can hold user name and password combinations, tickets, or public key certificates. This data is used during authentication, when principals are populated in subjects, and, further, during authorization, when determining what actions the subject can perform. The credential store refers to the portion of the security store where credentials are kept. The OPSS provides the Credential Store Framework that includes an API that applications can use to create, read, update, and manage credentials programmatically.

In accordance with an embodiment, a keystore service can provide a keystore as a central repository for keys and certificates used by domain components and applications. An example audit service, e.g., Oracle Fusion Middleware Audit Framework, provides an audit store, a central repository of audit records for a domain; and can be used to audit events triggered by configuration changes as well as operational activity for components and deployed applications. The audit store can be a file or a database.

As described above, to build and use the security services and security artifacts stored in data stores, a multi-tenant environment needs appropriate security configurations for each tenant, which, in accordance with an embodiment, can be created when tenants are being onboarded.

Figure 4:
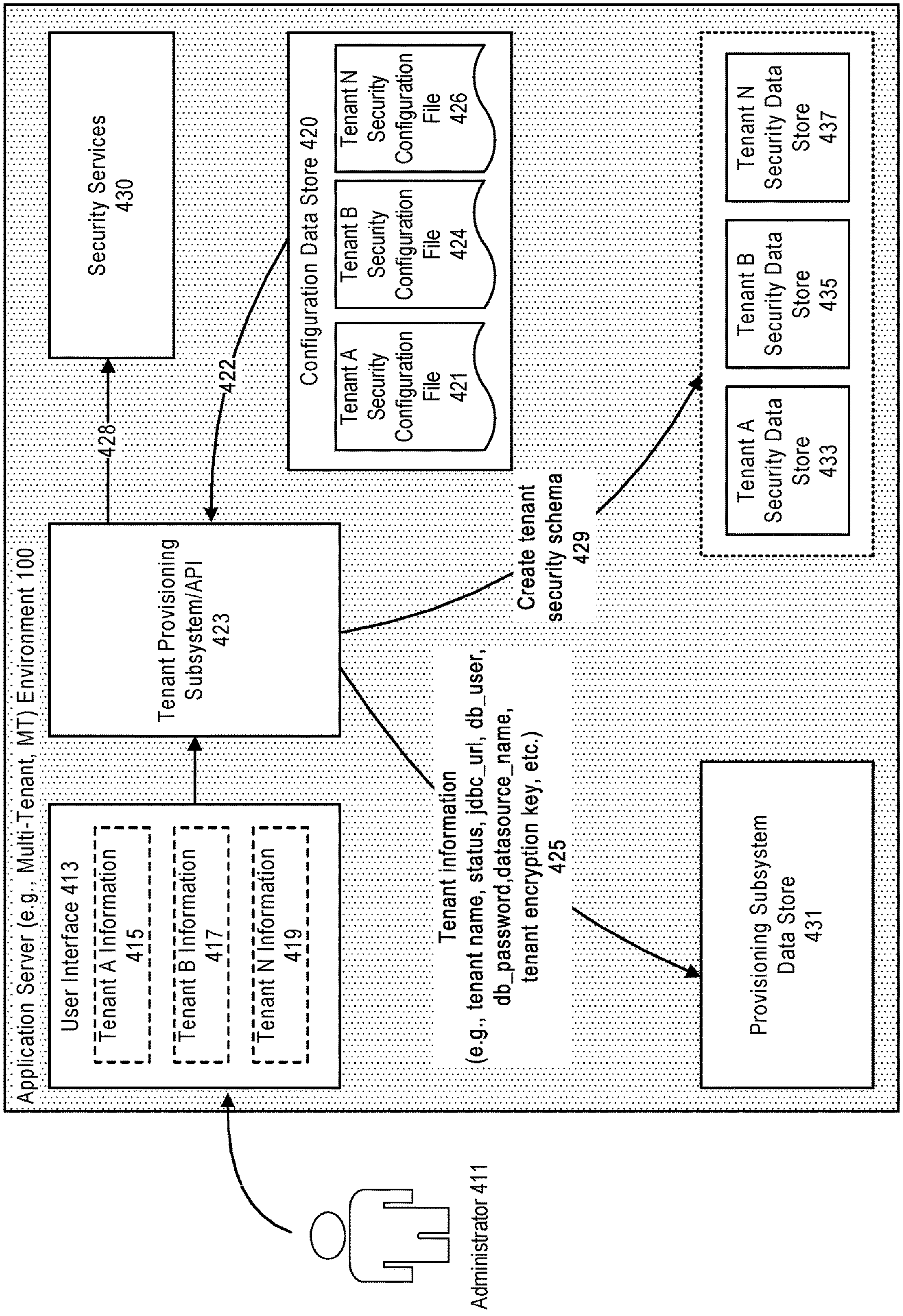
FIG. 4 illustrates a system for onboarding tenants in accordance with an embodiment.

FIG. 4 illustrates a system for onboarding tenants in accordance with an embodiment.

As shown in FIG. 4, for each tenant to be onboarded to the multi-tenant application server environment 100, a system administrator 411 can create a tenant security profile, a tenant administrator account, and a data source for a tenant-specific data store 433, 435, and 437.

In accordance with an embodiment, in response to receiving tenant information 415, 417, and 419 that is provided at a user interface 413, a tenant provisioning subsystem/API 423 can create a tenant security schema 429 in each tenant-specific data store, and store the tenant information 425 to a provisioning subsystem data store 431.

In accordance with an embodiment, the tenant information can include tenant name, status, JDBC URL, database user, database password, datasource name, tenant encryption key, tenant data store details, and tenant configuration location.

In accordance with an embodiment, the tenant provisioning subsystem can also create a service instance for each tenant, specify a particular partition and a database for the service instance, and map the tenant to the particular partition.

As further shown in FIG. 4, a plurality of tenant-specific security configurations 421, 424, and 426 can be maintained in a configuration data store 420, and can be used 422 by the tenant provisioning subsystem/API to configure 428 a plurality of security services 430 for each tenant.

In accordance with an embodiment, a tenant context can be established at runtime based on a security configuration specific to a tenant to handle requests from the tenant.

Security Configuration Template

Figure 5:
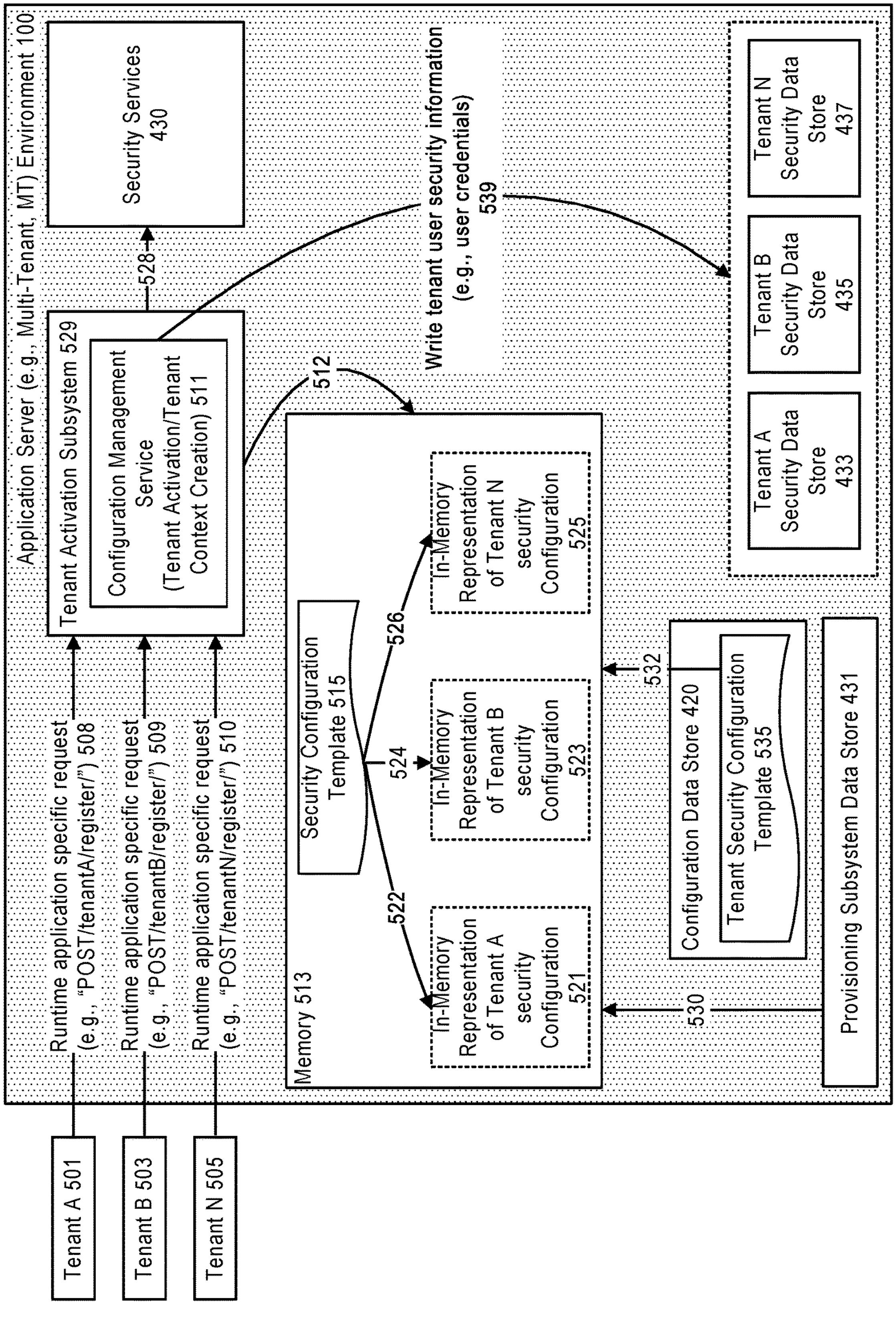
FIG. 5 illustrates a system for providing security services using a security configuration template in a multi-tenant environment, in accordance with an embodiment.

FIG. 5 illustrates a system for providing security services using a security configuration template in a multi-tenant environment, in accordance with an embodiment.

In accordance with an embodiment, instead of maintaining a security configuration for each tenant in a configuration data store, the system can maintain a single security configuration template 535 in the configuration data store 420.

In accordance with an embodiment, the security configuration template can be loaded 532 into memory 513, and can start a set of default security services in the multi-tenant environment.

In accordance with an embodiment, as part of the tenant on-boarding process, each of a plurality of tenants 501, 503, and 505 that have been provisioned can send an application-specific request 508, 509, and 510 to a tenant activation subsystem 529.

For example, the application-specific request can be a request for registering a tenant user for a tenant.

In accordance with an embodiment, when receiving the application-specific request from a tenant, the tenant activation subsystem can invoke a configuration management service (e.g., a library) 511 to create 512 a security configuration 521,523, and 525 specific to the tenant in memory, and to wire 539 the tenant-specific security configuration and a tenant-specific security data store by writing tenant user security information (e.g., user credentials) to the tenant-specific security data store.

In accordance with an embodiment, each tenant-specific security configuration can be an in-memory representation created from 522, 524, and 526 from an in-memory representation 515 of the security configuration template 535 loaded from the configuration data store 420.

In accordance with an embodiment, when creating a security configuration for a tenant, the configuration management service can use tenant information specific to the tenant retrieved 530 from the provisioning subsystem data store 431 to replace placeholders in the security configuration template.

In accordance with an embodiment, each of the placeholders in the security configuration template can have a default value, and can include a macro. As used herein, a macro can represent a single instruction that can automatically expand into a set of instructions to perform a particular task, for example, replacing a placeholder with a tenant-specific value.

Listing 1 below illustrates an example tenant configuration template in accordance with an embodiment.

Listing 1

```
<config>
<propertySet name="tenant.store.properties">
        <property name="oracle.security.jps.farm.name"
        value="cn=opssSecurityStore"/>
        <property name="server.type" value="DB_ORACLE"/>
        <property name="oracle.security.jps.Idap.root.name"
        value="cn=opssRoot"/>
        <property name="datasource.jndi.name" value="@JNDI@"/>
        <property name="encryption.key.map" value="@ID@"/>
</propertySet>
<serviceInstance name="credstore" provider="credstore.provider">
        <propertySetRef ref="tenant.store.properties"/>
</serviceInstance>
<Contexts default="default">
        <Context name="default">
                <serviceInstanceRef ref="credstore"/>
        </Context>
</Contexts>
</config>
```

In Listing 1 as shown above, @JNDI@ and @ID@ are two macros whose values can be injected with values specific to a tenant, to create a tenant-specific security configuration in memory on the first tenant request when the tenant is being onboarded. In the in-memory representation of the tenant-specific security configuration, the default context can be set to a new runtime tenant context. Each new request from the tenant can be served by loading the tenant-specific security configuration from memory, and using the tenant-specific security configuration to refer to that tenant's keys and/or data store.

Figure 6:
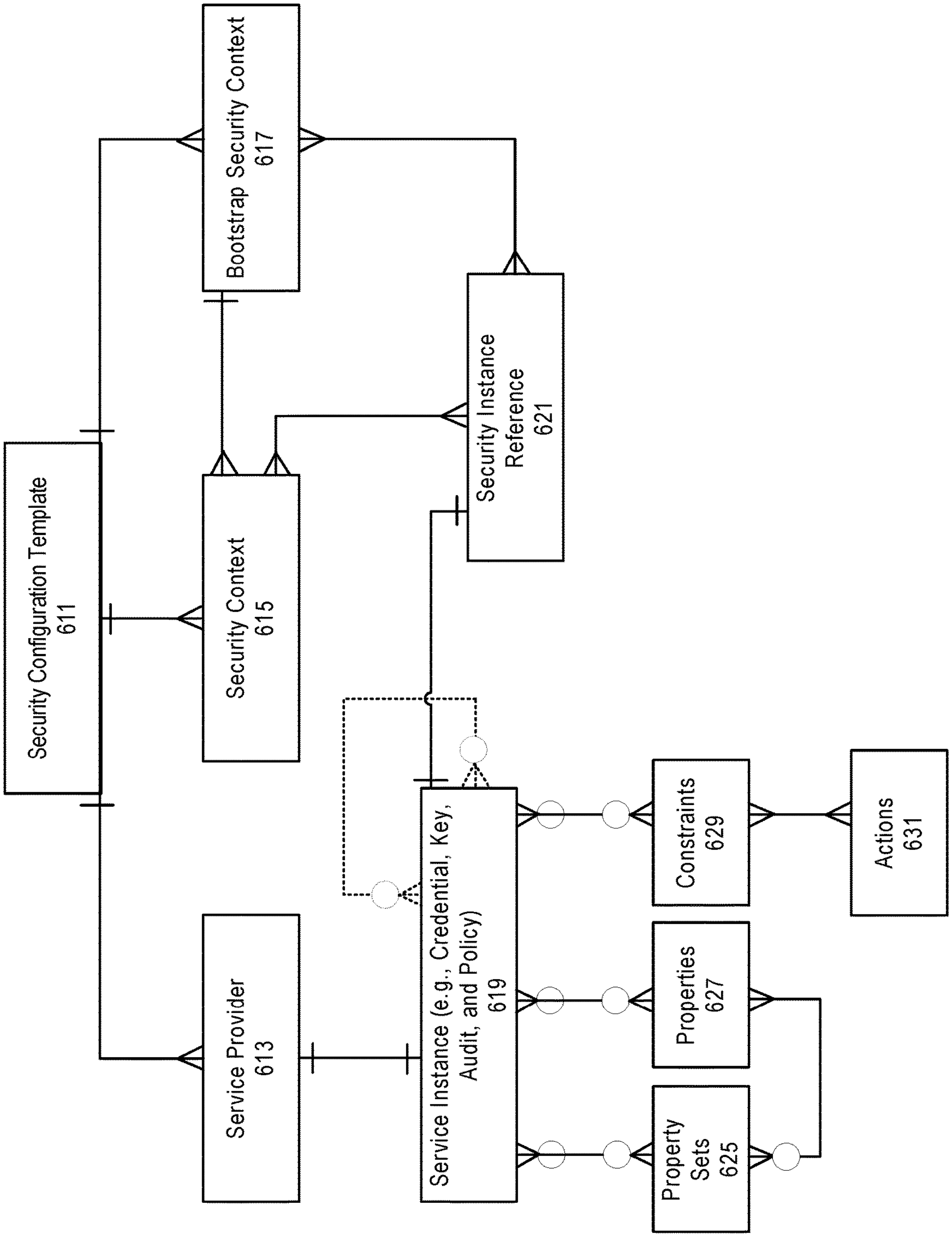
FIG. 6 illustrates an entity relationship diagram (ERD) showing various entities in a security configuration template, in accordance with an embodiment.

FIG. 6 illustrates an entity relationship diagram (ERD) showing various entities in a security configuration template, in accordance with an embodiment.

In FIG. 6, the ERD does not show attributes of the various entities for simplicity. The example tenant-specific security configuration described in Listing 1 can be based on the ERD.

In accordance with an embodiment, in the ERD, a security configuration template 611 can be associated with one or more service provider entities 613, one or more security context entities 615, and one or more bootstrap security context entities 617. Each bootstrap security context entity can be associated with one or more security context entities.

As further shown in FIG. 6, each service provider entity can be associated with one service instance entity 619, which can be a credential security service entity, a key security service entity, an audit security service entity, or a policy security service entity. Each service instance entity can be associated with zero or more service instance entities of other types.

For example, a credential security service entity can be associated with zero or more audit security service entities; an audit security service can be associated with zero or more credential security service entities.

In accordance with an embodiment, each security instance reference entity 621 can have a one-to-one relationship with a service instance entity, and a many-to-many relationship with a security context entity, and a many-to-many relationship with a bootstrap security context entity.

In accordance with an embodiment, a service instance entity can be associated with zero or more property sets entities 625, zero or more properties entities 627, and zero or more constraints entities 629. Similarly, each of a property sets entity, a properties entity, and a constraints entity can be associated with zero or more service instance entities.

In accordance with an embodiment, a property sets entity can be associated with one or more properties entities, and a properties entity can be associated with zero or more property sets entities. A constraints entity can have a many-to-many relationship with an actions entity 631.

Figure 7A:
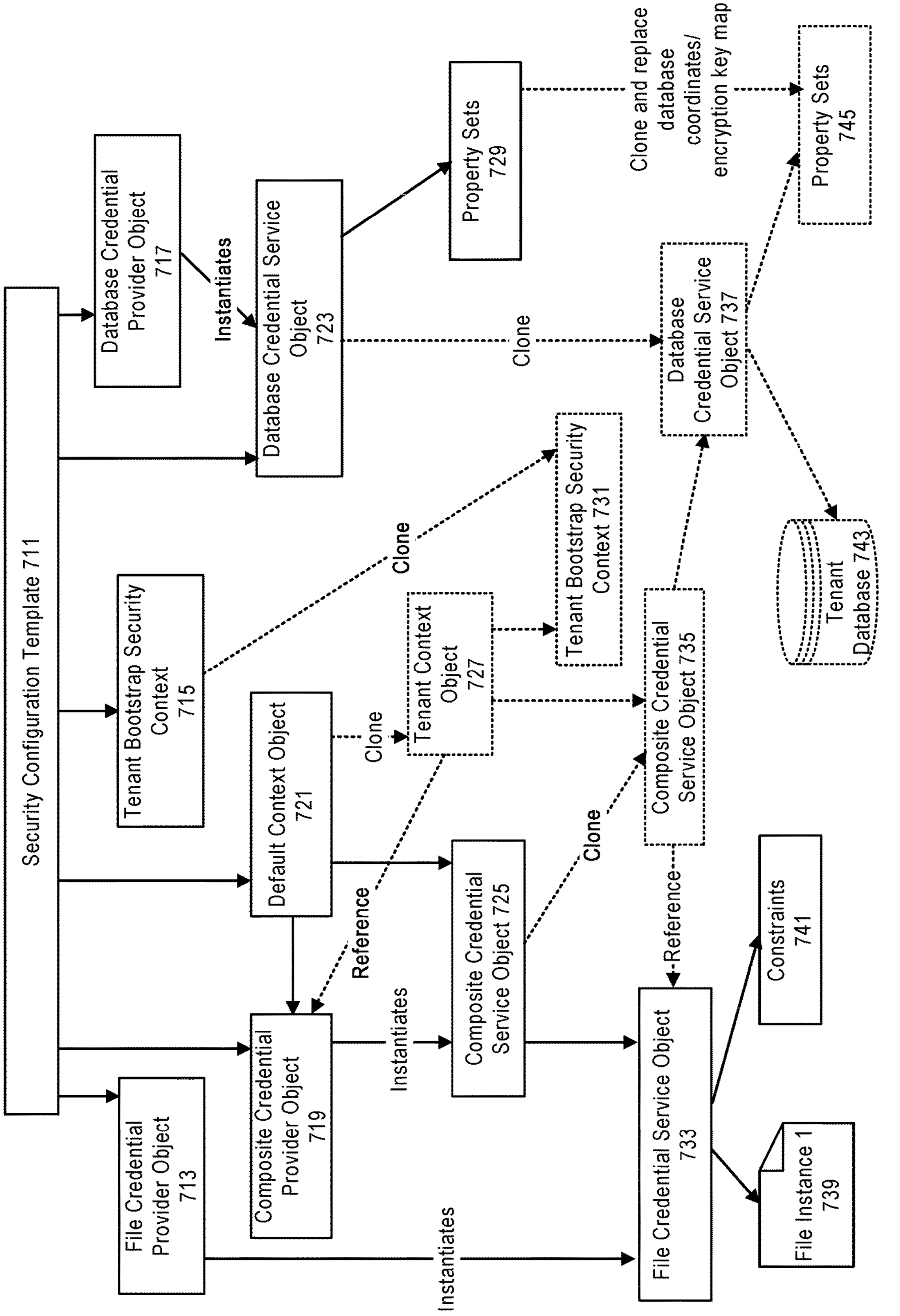
FIG. 7A illustrates an in-memory view of a security configuration template when a new tenant is activated, in accordance with an embodiment.

FIG. 7A illustrates an in-memory view of a security configuration template when a new tenant is activated, in accordance with an embodiment.

As shown in FIG. 7A, the in-memory view of the security configuration template represents an object inheritance model. For simplicity, FIG. 7 shows only one security service (i.e. credential service) within a security configuration template 711.

The security configuration template can include a file credential provider object 713, a tenant bootstrap security context 715, a database credential provider object 717, a composite credential provider object 719, a default context object 721, a database credential service object 723.

The security configuration template can further include a composite credential service object 725, a property sets entity 729, a file credential service object 733, a file instance 739, and a constraints entity 741.

As further shown in FIG. 7, a plurality of entities (in dotted lines) can be added to the in-memory view of the security configuration template as a new tenant is activated as part of the tenant onboarding process.

In accordance with an embodiment, the above-described entities in the security configuration template can be referenced by a tenant-specific security configuration, or can be cloned with tenant-specific values injected into the cloned nodes.

For example, the newly added entities include a tenant context object 727 cloned from the default context object 721, a tenant bootstrap security context 731 cloned from the tenant bootstrap security context 715, a composite credential service object 735 cloned from the composite credential service object 725, a database credential service object 737 cloned from the database credential service object 723, and a property sets entity 745 cloned from the property sets entity 729.

In each of the cloned nodes, placeholders therein can be replaced by a tenant-specific values. For example, for the property sets entity 745, placeholders therein can be replaced by database coordinates and encryption key map specific to a tenant.

In accordance with an embodiment, nodes in the security configuration template can also be reused through referencing by a tenant-specific configuration.

For example, the tenant-specific configuration can reuse the composite credential provider object 719 and the composite credential service object 733 by referencing them.

Figure 7B:
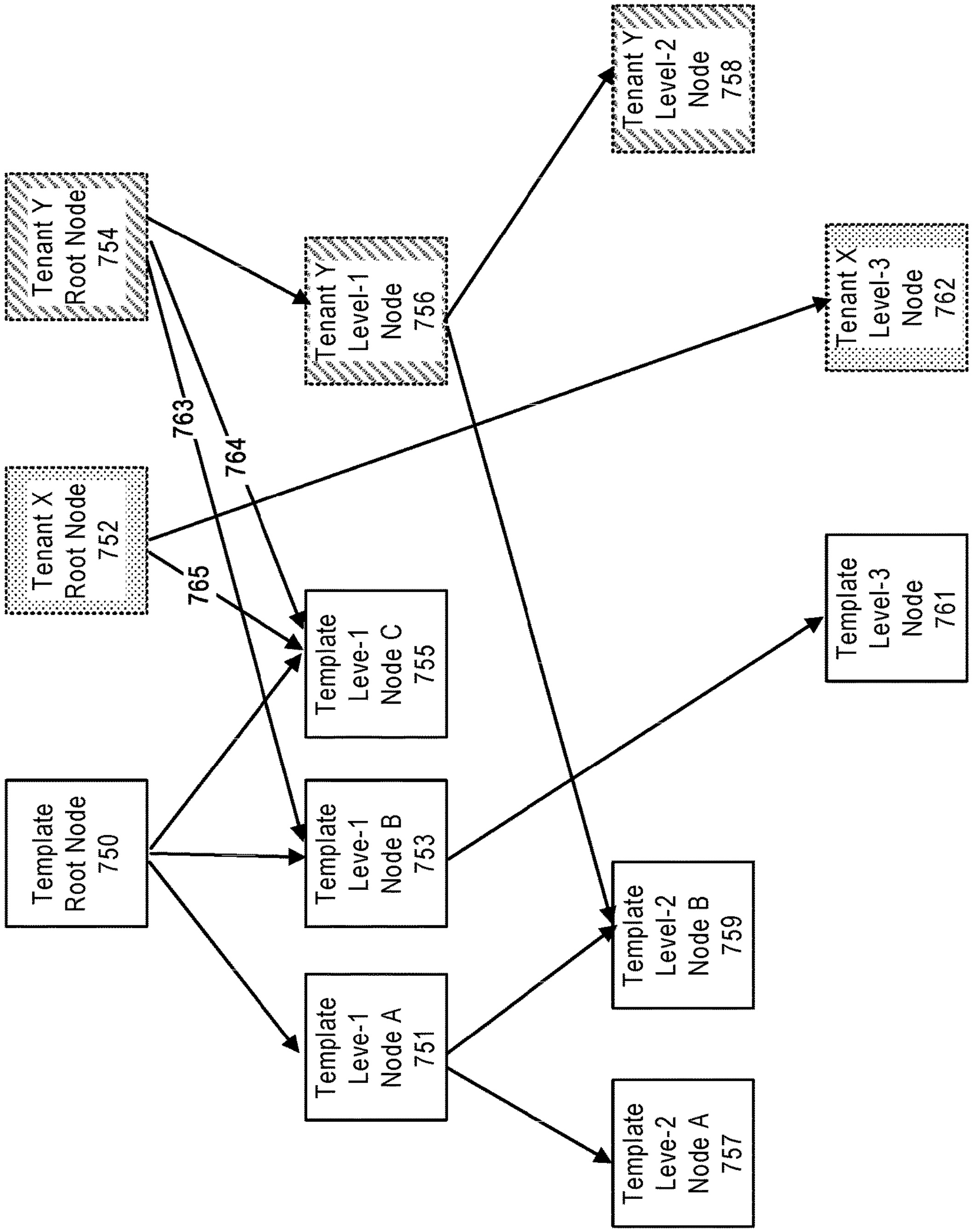
FIG. 7B illustrates another in-memory view of a security configuration template when new tenants are activated, in accordance with an embodiment.

FIG. 7B illustrates another in-memory view of a security configuration template when new tenants are activated, in accordance with an embodiment.

In accordance with an embodiment, the in-memory view represents a multi-headed configuration tree that includes a template configuration tree and one or more tenant-specific configuration trees. The template configuration tree and each tenant-specific configuration tree can have a separate root node (i.e. head).

FIG. 7B shows that the multi-headed tree can include a template configuration tree with a template root node 750, a configuration tree for tenant X with a root node 752, and a configuration tree for tenant Y with a root node 754.

In accordance with an embodiment, the template configuration tree can be created when the security configuration template is loaded in memory. As shown in FIG. 7B, in addition to the template root node, the template configuration tree can include three level-1 nodes 751, 753, and 755, two level-2 nodes 757 and 759, and one level-3 node 761.

In accordance with an embodiment, a configuration tree specific to a tenant can be built by a configuration management service when the tenant is activated or on-boarded. When building the tenant-specific tree, the configuration management service first can create a tenant-specific root node, for example, from the template root node. Subsequently, the configuration management service can traverse the template tree, compare template nodes with security information for the tenant, and then either reuse template nodes (e.g., common services that are base immutable service nodes) or create tenant-specific nodes with tenant-specific values.

In accordance with an embodiment, a tenant-specific configuration tree can reuse a template node by referencing the template node.

For example, the configuration tree for tenant Y include three level-1 nodes. However, two of the three level-1 nodes are reused template level-1 nodes 753 and 755, and one node 756 is a newly created tenant-specific node. The tenant-specific tree for tenant Y can reuse the two template nodes by referencing 763 and 764 them. Similarly, the configuration tree for tenant Y has two level-2 nodes, with one 759 being a reused template node, and the other being a newly-created tenant-specific node 758.

As further shown in FIG. 7B, in addition to the root node 752, the configuration tree for tenant X includes two nodes: the template node 755 that is referenced 765 by the configuration tree, and a tenant-specific node 762 that is newly created by the configuration management service.

In accordance with an embodiment, in the multi-headed configuration tree, a template node can be reused by multiple tenant-specific configuration trees; the reuse of template nodes can reach any level in the template configuration tree.

For example, the configuration tree for tenant Y can still reuse template node 759 even if the parent node 751 of the template node 759 is not reused by the tenant-specific configuration tree. Consequently, the template node 759 can operate as a common sub-node for both the newly created tenant-specific node 756 and the template node 751.

In accordance with an embodiment, a tenant name/ID can be maintained outside of the multi-headed configuration tree. An external mapping service can map each tenant name/ID against a reference to the tenant-specific root node. When retrieving a tenant-specific configuration, the mapping service can be invoked to first obtain the root node of the tenant specific configuration using the tenant name/ID, and then to traverse the tenant-specific configuration tree based on the tenant-specific root node. Based on the traversal, the tenant-specific configuration can be obtained.

In accordance with an embodiment, a configuration tree for a tenant can also maintain a tenant name/ID in each of its nodes, including reused template nodes and tenant-specific nodes. In this embodiment, the configuration management service can traverse the multi-headed tree to locate each node with the tenant name/ID and use those nodes to create a security configuration specific to the tenant.

Figure 8:
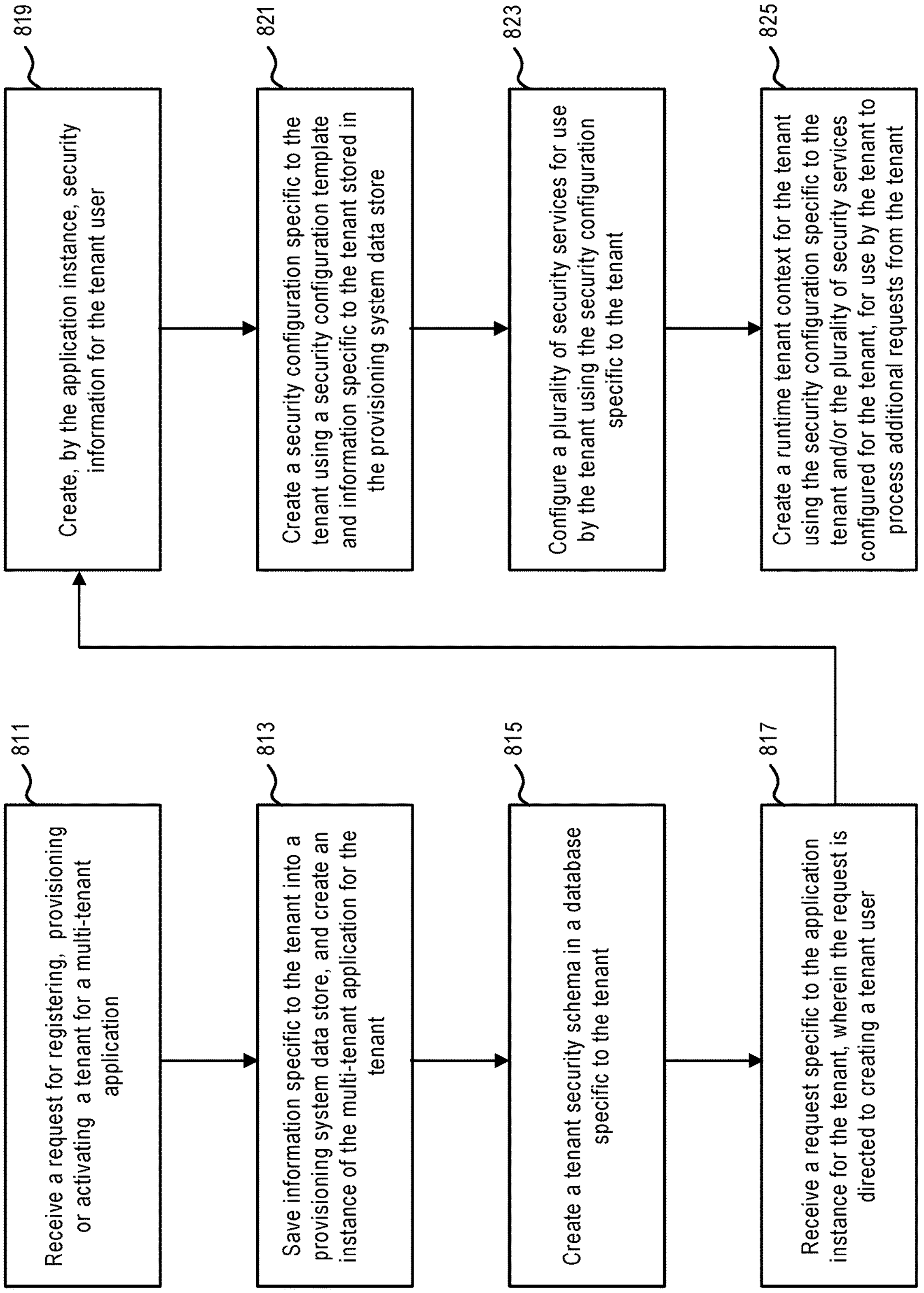
FIG. 8 illustrates an example flow diagram of the invention, in accordance with an embodiment.

FIG. 8 illustrates an example flow diagram of the invention, in accordance with an embodiment.

As shown in FIG. 8, at step 811, a request for registering, provisioning or activating a tenant for a multi-tenant application.

At step 813, information specific to the tenant is extracted from the request, and saved into a provisioning system data store; an instance of the multi-tenant application for the tenant is also created at this step.

At step 815, a tenant security schema is created in a database specific to the tenant to store the information specific to the tenant extracted from the request.

At step 817, a request specific to the application instance for the tenant is received, wherein the request is directed to creating a tenant user.

At step 819, the application instance creates security information for the tenant user, wherein the security information can include credentials for the tenant user, and policy information associated with the tenant user.

At step 821, a security configuration specific to the tenant is created using a security configuration template and information specific to the tenant stored in the provisioning system data store.

At step 823, a plurality of security services are configured for use by the tenant using the security configuration specific to the tenant.

At step 825, a runtime tenant context is created for the tenant using the security configuration specific to the tenant and/or the plurality of security services configured for the tenant, for use by the tenant to process additional requests from the tenant.

Example Use Cases

Features of the invention described above can be used in a plurality of use cases for onboarding tenants.

For example, in a multi-tenant application server environment (e.g., a WebLogic server), tenants need to be activated each time the application server is started. The activation state is not persisted anywhere, and is effective only in the Java virtual machine (JVM) which hosts EnterpriseApplication2.ear.

Listing 2 below illustrates example commands used to activate tenants so that the OPSS can work appropriately with each tenant's security store.

Listing 2

```
activate cisco tenant
curl -H "Content-Type:application/json" -X POST -d
@http://localhost:7001/mttest/management/tenant/activate << EOF
{
        "tenantId" : "cisco",
        "dataSourceName": "jndi/Opss/cisco",
        "encPassword": "Welcome"
}
EOF
# Expected response:
# {"message": "Tenant context cisco activated"}
activate intel tenan
curl -H "Content-Type:application/json" -X POST -d
@http://localhost:7001/mttest/management/tenant/activate << EOF
{
        "tenantId" : "intel",
        "dataSourceName": "jndi/Opss/intel",
        "encPassword": "Welcome"
}
EOF
# Expected response: # {"message": "Tenant context intel activated"}
```

As shown in Listing 2, a tenant identifier (e.g., tenantId) can be used for tenant context switches. The tenant identifier can be the same as the tenant name (e.g. cisco or intel). "dataSourceName" can be the JNDI name of the tenant's OPSS datasource, and encPassword can be the encryption key password specified when the tenant's OPSS schema is enabled to be used as the tenant's security store at runtime.

In accordance with an embodiment, for a tenant context to be activated as described in Listing 2, a tenant-specific security configuration needs to be created first from the security configuration template, for use in configuring the OPSS.

Figure 9:
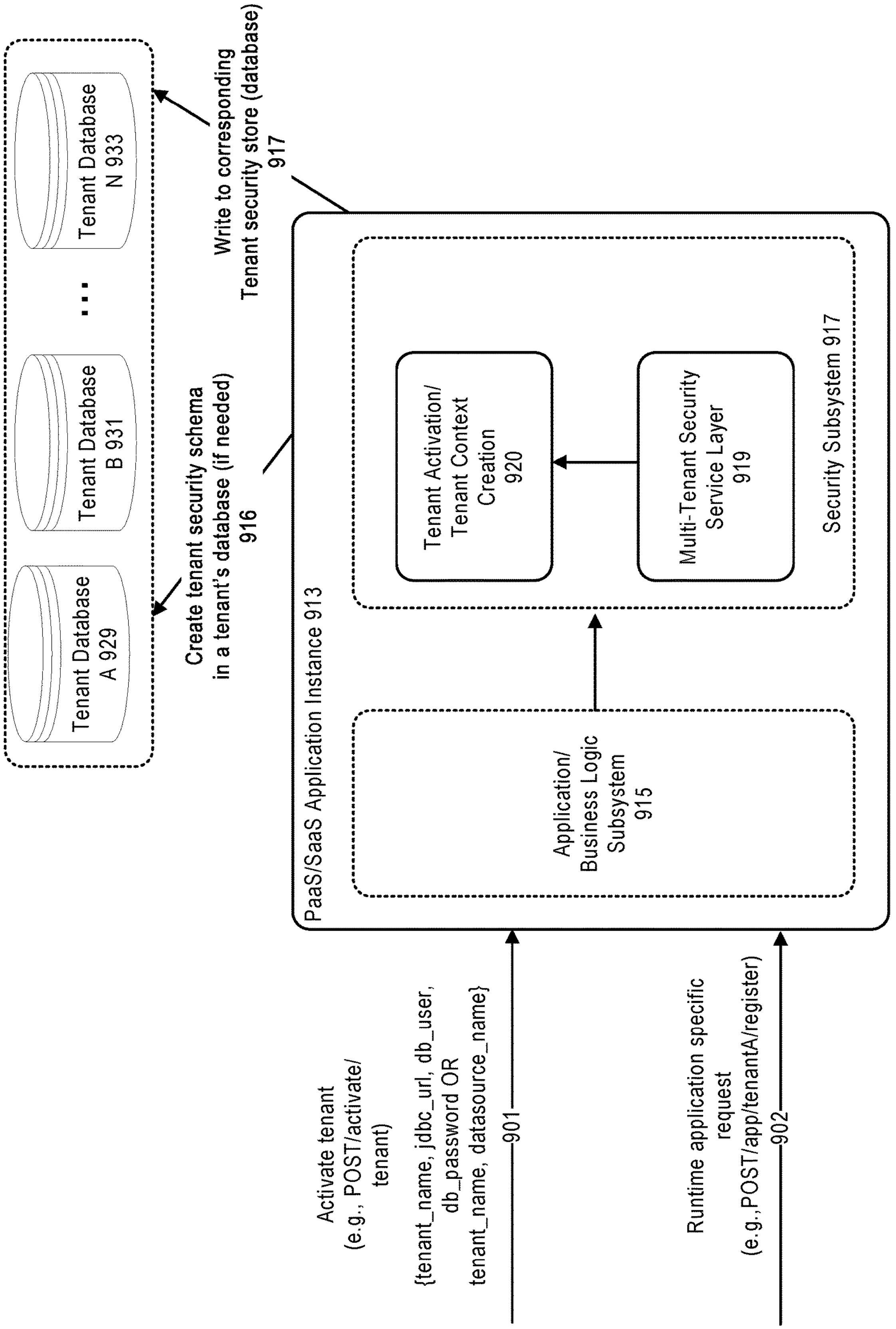
FIG. 9 illustrates an end-to-end implementation showing how a SaaS/PaaS application uses features provided by the invention, in accordance with an embodiment.

FIG. 9 illustrates an end-to-end implementation showing how a SaaS/PaaS application uses features provided by the invention, in accordance with an embodiment.

As shown in FIG. 9, an application/business logic subsystem 915 in a PaaS/SaaS application instance 913 can receive a request 901 to activate a tenant. The activation request can include a tenant name, a jdbc url, a database user, and a database password. Alternatively, the activation request can include a tenant name and a datasource name. The PaaS/SaaS application instance can be an application instance created using a security configuration template.

In accordance with an embodiment, the application/business logic subsystem can create 916 a tenant security schema in a database for the tenant 929, 931, or 933.

Next, the tenant activation/tenant context creation module 920 in a security subsystem of the PaaS/SaaS application instance can activate the tenant, for example, by creating a service instance for the tenant.

When the application/business logic subsystem receives a runtime application specific request 902 from a tenant (e.g., Tenant A), for example, "POST/app/tenantA/register" used to register tenant users for tenant A, a multi-tenant security service layer 919 in the security subsystem can invoke the tenant activation/tenant context creation module, to create a security configuration specific to the tenant based on the security configuration template.

In accordance with an embodiment, the multi-tenant security layer can include a plurality of security service instances, which can be configured using the tenant-specific security configuration.

The security subsystem can write 917 tenant user security information (e.g., tenant user credentials) to a corresponding tenant database.

Figure 10:
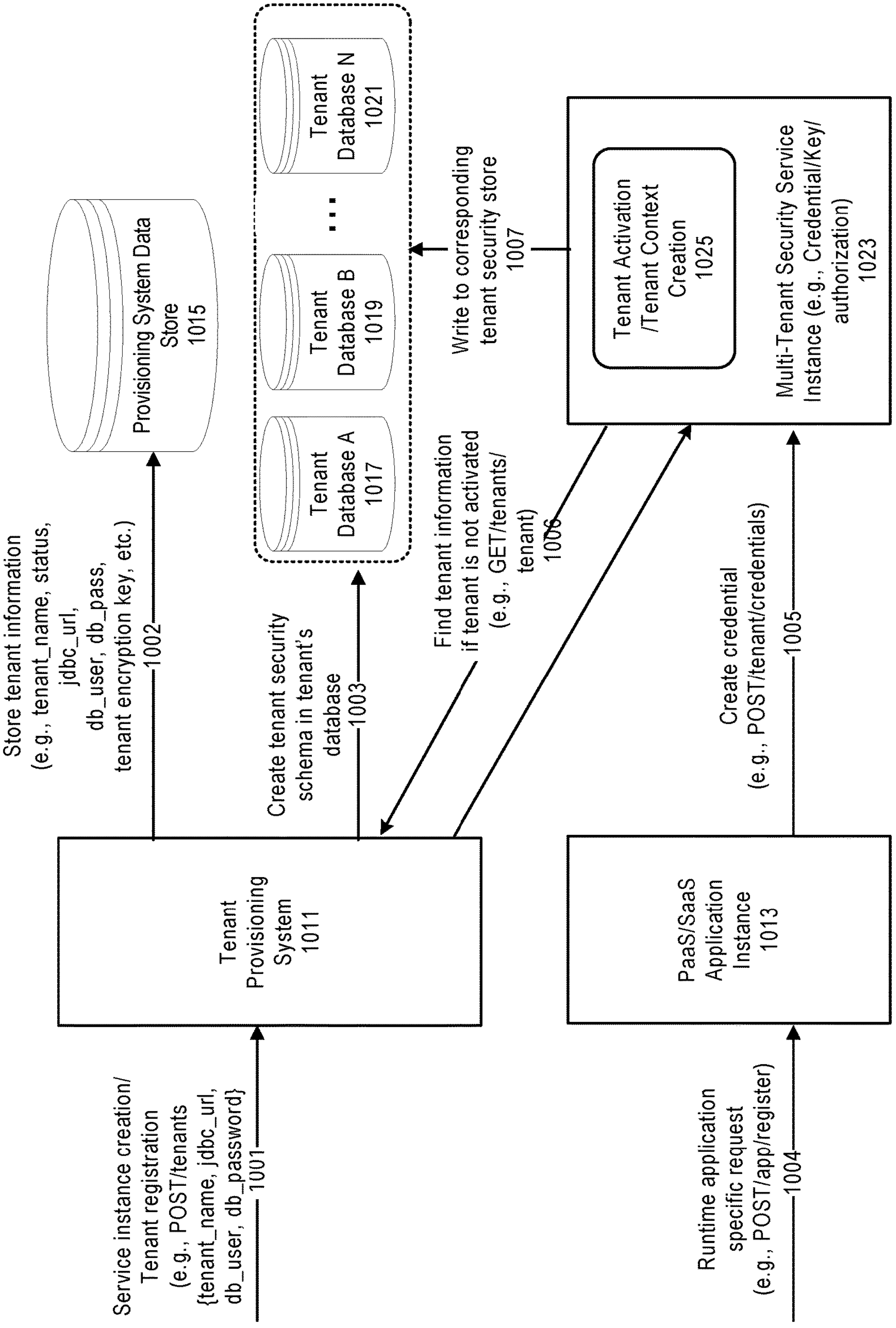
FIG. 10 illustrates another end-to-end implementation showing how and where features provided by the inventions are used by microservices, in accordance with an embodiment.

FIG. 10 illustrates another end-to-end implementation showing how and where features provided by the inventions are used by microservices, in accordance with an embodiment.

As shown in FIG. 10, this end-to-end implementation can include a tenant provisioning system 1011, a PaaS/SaaS application instance 1013, and one or more multi-security services 1023; each of which above components can be a microservice.

In accordance with an embodiment, at step 1001, the tenant provisioning subsystem can receive a request from an administrator for creating a service instance for a tenant or registering the tenant. For example, the request can be "POST/tenants/" with parameters for tenant information, such as a tenant_name, a jdbc_url, a database user, and a database password.

At step 1002, the tenant provisioning subsystem can store the tenant information from the request and other information (e.g., tenant encryption key) to a provisioning system data store 1015.

At step 1003, the tenant provisioning subsystem can create a security schema in a tenant database 1017, 1019, or 1021 corresponding to the tenant specified by the request.

At step 1004, the PaaS/SaaS application instance can receive a runtime application specific request from a tenant. For example, the request can be "POST/app/tenant/register", which is used to register tenant users for the tenant. In accordance with an embodiment, the PaaS/SaaS application instance can an application instance created specifically for the tenant when the tenant is provisioned or registered.

At step 1005, the PaaS/SaaS application instance can create tenant user security information (e.g., tenant user credentials and policies) for the tenant users, and pass the tenant user security information to the one or more multi-tenant security instances.

At step 1006, a tenant activation/tenant context creation module 1025 in the one or more multi-tenant security instances can retrieve information specific to the tenant, through the tenant provisioning subsystem, from the provisioning system data store if the tenant is not activated. The tenant activation/tenant context creation module can subsequently activate the tenant, create a security configuration specific to the tenant based on the security configuration template, and create a tenant context for processing additional requests from the tenant.

At step 1007, the one or more multi-tenant security instances can write the tenant security information to a corresponding tenant database 1017, 1019 or 1021.

In accordance with an embodiment, FIG. 9 and FIG. 10 describe implementation flows in different environments. The implementations in FIG. 9 and FIG. 10 or a variation of each implementation can also be combined to create a new implementation of the invention.

Figure 11:
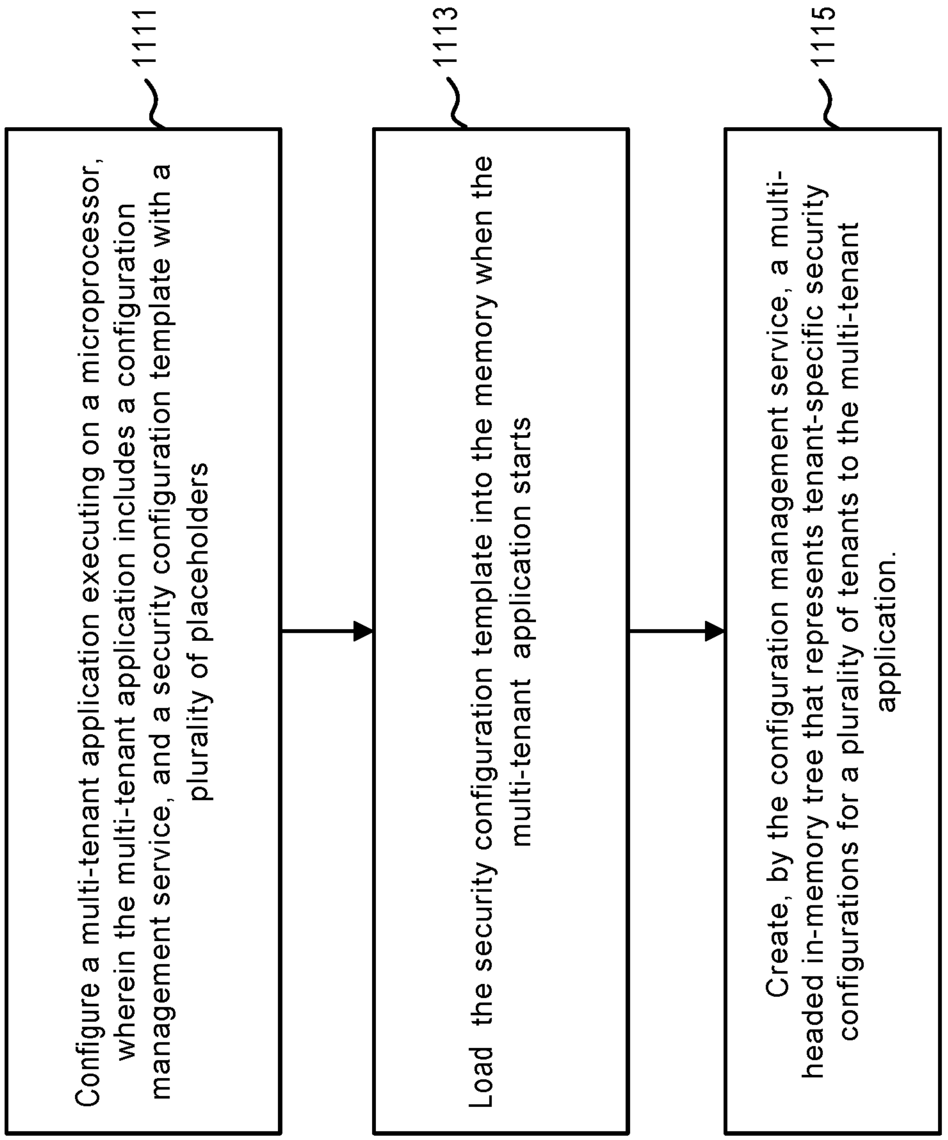
FIG. 11 illustrates a method for providing security services using a security configuration template in a multi-tenant environment, in accordance with an embodiment.

FIG. 11 illustrates a method for providing security services using a security configuration template in a multi-tenant environment, in accordance with an embodiment.

As shown in FIG. 11, in accordance with an embodiment, at step 1111, a multi-tenant application executing on a microprocessor is configured, wherein the multi-tenant application includes a configuration management service, and a security configuration template with a plurality of placeholders.

At step 1113, the security configuration template is loaded into memory when the multi-tenant application starts.

At step 1115, the configuration management service creates a multi-headed in-memory tree that represents tenant-specific security configurations for a plurality of tenants to the multi-tenant application.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer-readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer-readable medium is a non-transitory storage medium or non-transitory computer readable medium.

The foregoing description is not intended to be exhaustive or to limit the invention to the precise forms disclosed.

Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for providing security services for a multi-tenant environment, comprising:

a microprocessor and memory;

a multi-tenant application executing on the microprocessor, wherein the multi-tenant application includes a configuration management service, and a security configuration template with a plurality of placeholders;

wherein the security configuration template is loaded into the memory when the multi-tenant application starts;

wherein the configuration management service operates to create a multi-headed in-memory tree that represents tenant-specific security configurations for a plurality of tenants to the multi-tenant application by performing steps comprising:

creating the root node for each of the plurality of tenants by duplicating the root node of the in-memory representation of the security configuration template;

traversing the in-memory representation of the security configuration template;

comparing nodes in the security configuration template at each level with security information for the tenant, reusing one or more template nodes by referencing those nodes, and creating one or more new nodes from the security configuration template by replacing each placeholder in the security configuration template with values specific to the tenant; and wherein each head in the multi-headed in-memory tree is a root node of either an in-memory tree representation of either the security configuration template or a tenant-specific security configuration.

2. The system of claim 1, wherein each tenant-specific security configuration is created when the tenant is onboarded.

3. The system of claim 1, wherein each of the tenant-specific security configuration is configured to provide a plurality of security services for use by a tenant.

4. The system of claim 3, wherein providing the plurality of security services specific to the tenant includes configuring or building the plurality of security services for use by the tenant.

5. The system of claim 1, wherein the tenant-specific security configuration in the multi-headed tree is recreated in the memory on a first request specific to an application instance for the tenant when a virtual machine hosting the plurality of security services restarts.

6. The system of claim 1, wherein the configuration management service is provided for use by the system as a library or a microservice.

7. The system of claim 1, wherein the plurality of security services include a credential service, a key service, an authorization service, and an audit service.

8. The system of claim 1, wherein the multi-tenant application is a Platform as a Service, a Software as a Service, or a cloud-based or on-premises application server.

9. The system of claim 1, wherein the configuration management service operates to create a runtime tenant context based on the security configuration specific to the tenant, for use in processing additional requests from the tenant.

10. A method for providing security services for a multi-tenant environment, comprising:

configuring a multi-tenant application executing on a microprocessor, wherein the multi-tenant application includes a configuration management service, and a security configuration template with a plurality of placeholders;

loading the security configuration template into the memory when the multi-tenant application starts; and creating, by the configuration management service, a multi-headed in-memory tree that represents tenant-specific security configurations for a plurality of tenants to the multi-tenant application by performing steps comprising:

creating the root node for each of the plurality of tenants by duplicating the root node of the in-memory representation of the security configuration template;

traversing the in-memory representation of the security configuration template;

comparing nodes in the security configuration template at each level with security information for the tenant, reusing one or more template nodes by referencing those nodes, and creating one or more new nodes from the security configuration template by replacing each placeholder in the security configuration template with values specific to the tenant;

wherein each head in the multi-headed in-memory tree is a root node of either an in-memory tree representation of either the security configuration template or a tenant-specific security configuration.

11. The method of claim 10, wherein each tenant-specific security configuration is created when the tenant is onboarded.

12. The method of claim 10, wherein each of the tenant-specific security configuration is configured to provide a plurality of security services for use by a tenant.

13. The method of claim 10, wherein providing the plurality of security services specific to the tenant includes configuring or building the plurality of security services for use by the tenant.

14. The method of claim 10, wherein the tenant-specific security configuration in the multi-headed tree is recreated in the memory on a first request specific to an application instance for the tenant when a virtual machine hosting the plurality of security services restarts.

15. The method of claim 10, wherein the configuration management service is provided for use by the system as a library or a microservice.

16. A non-transitory computer-readable storage medium storing a set of instructions for providing security services for a multi-tenant environment, said instructions, when executed by one or more processors, causing the one or more processors to perform steps comprising:

configuring a multi-tenant application executing on a microprocessor, wherein the multi-tenant application includes a configuration management service, and a security configuration template with a plurality of placeholders;

loading the security configuration template into the memory when the multi-tenant application starts; and creating, by the configuration management service, a multi-headed in-memory tree that represents tenant-specific security configurations for a plurality of tenants to the multi-tenant application by performing steps comprising:

creating the root node for each of the plurality of tenants by duplicating the root node of the in-memory representation of the security configuration template;

traversing the in-memory representation of the security configuration template;

comparing nodes in the security configuration template at each level with security information for the tenant, reusing one or more template nodes by referencing those nodes, and creating one or more new nodes from the security configuration template by replacing each placeholder in the security configuration template with values specific to the tenant;

wherein each head in the multi-headed in-memory tree is a root node of either an in-memory tree representation of either the security configuration template or a tenant-specific security configuration.

* * * * *